(12) United States Patent
DeAngelis et al.

(10) Patent No.: US 10,552,967 B2
(45) Date of Patent: Feb. 4, 2020

(54) SYSTEMS AND METHODS FOR TRACKING AND CONTROLLING A MOBILE CAMERA TO IMAGE OBJECTS OF INTEREST

(71) Applicant: Isolynx, LLC, Haverhill, MA (US)

(72) Inventors: Douglas J. DeAngelis, Ipswich, MA (US); Edward G. Evansen, West Newbury, MA (US); Gerard M. Reilly, Newton, MA (US); Kirk M. Sigel, Ithaca, NY (US)

(73) Assignee: ISOLYNX, LLC, Haverhill, MA (US)

( * ) Notice: Subject to any disclaimer, the term of this patent is extended or adjusted under 35 U.S.C. 154(b) by 62 days.

(21) Appl. No.: 15/907,003

(22) Filed: Feb. 27, 2018

(65) Prior Publication Data
US 2018/0247421 A1 Aug. 30, 2018

Related U.S. Application Data

(60) Provisional application No. 62/464,281, filed on Feb. 27, 2017.

(51) Int. Cl.
*G06T 7/292* (2017.01)
*H04N 5/232* (2006.01)
(Continued)

(52) U.S. Cl.
CPC .......... *G06T 7/292* (2017.01); *B64C 39/024* (2013.01); *G06K 9/00369* (2013.01);
(Continued)

(58) Field of Classification Search
CPC .......... G06T 7/292; G06T 2207/30221; G01S 1/042; G01S 5/14; G01S 5/10;
(Continued)

(56) References Cited

U.S. PATENT DOCUMENTS

2008/0129825 A1 6/2008 DeAngelis et al.
2013/0234835 A1 9/2013 Piersol et al.

FOREIGN PATENT DOCUMENTS

EP 1175784 B1 1/2002
EP 2879371 A1 * 6/2015 ......... H04N 5/23203

OTHER PUBLICATIONS

International Search Report and Written Opinion of PCT/US2018/019851 dated Nov. 8, 2018, 13 pp.

* cited by examiner

*Primary Examiner* — Jon Chang
(74) *Attorney, Agent, or Firm* — Lathrop Gage LLP

(57) ABSTRACT

A method for using tracking tags to control mobile cameras to determine and capture desired perspective views of objects of interest (OOIs), includes locating each OOI and determining an orientation of each OOI. A second location of each mobile camera is determined with an orientation of each mobile camera; the method includes controlling, based upon the first and second location, and the orientations, the mobile camera to maintain desired perspective views of the OOIs despite movement of the OOIs. The method executes on a system for controlling a mobile camera including tracking tags configured with each OOI and tracking tags configured with the mobile cameras. A tracking apparatus having at least three receivers positioned around an operational area receives locate signals from the tracking tags to determining location data and a processor determines movement plans for the mobile cameras.

20 Claims, 12 Drawing Sheets

(51) Int. Cl.
  *G06K 9/32*  (2006.01)
  *G01S 5/02*  (2010.01)
  *G01S 1/00*  (2006.01)
  *B64C 39/02* (2006.01)
  *G06K 9/00*  (2006.01)

(52) U.S. Cl.
  CPC ....... *G06K 9/3241* (2013.01); *H04N 5/23219* (2013.01); *B64C 2201/127* (2013.01); *G01S 1/00* (2013.01); *G01S 5/0221* (2013.01); *G06K 9/32* (2013.01); *G06T 2207/30221* (2013.01)

(58) Field of Classification Search
  CPC ........... G01S 5/0221; G01S 3/02; G01S 1/00; H04N 5/232; H04N 5/23299; H04N 5/23296; H04N 5/23219; G06K 9/00771; G06K 9/00342; G06K 9/00369; G06K 9/3241; G06K 9/32; B64C 39/024; B64C 2201/127
  See application file for complete search history.

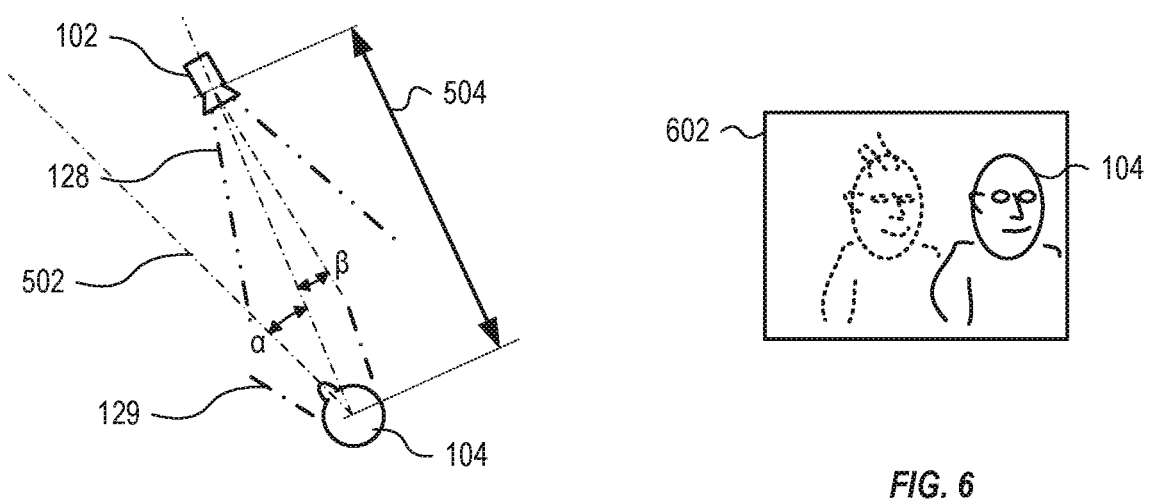
FIG. 5
FIG. 6
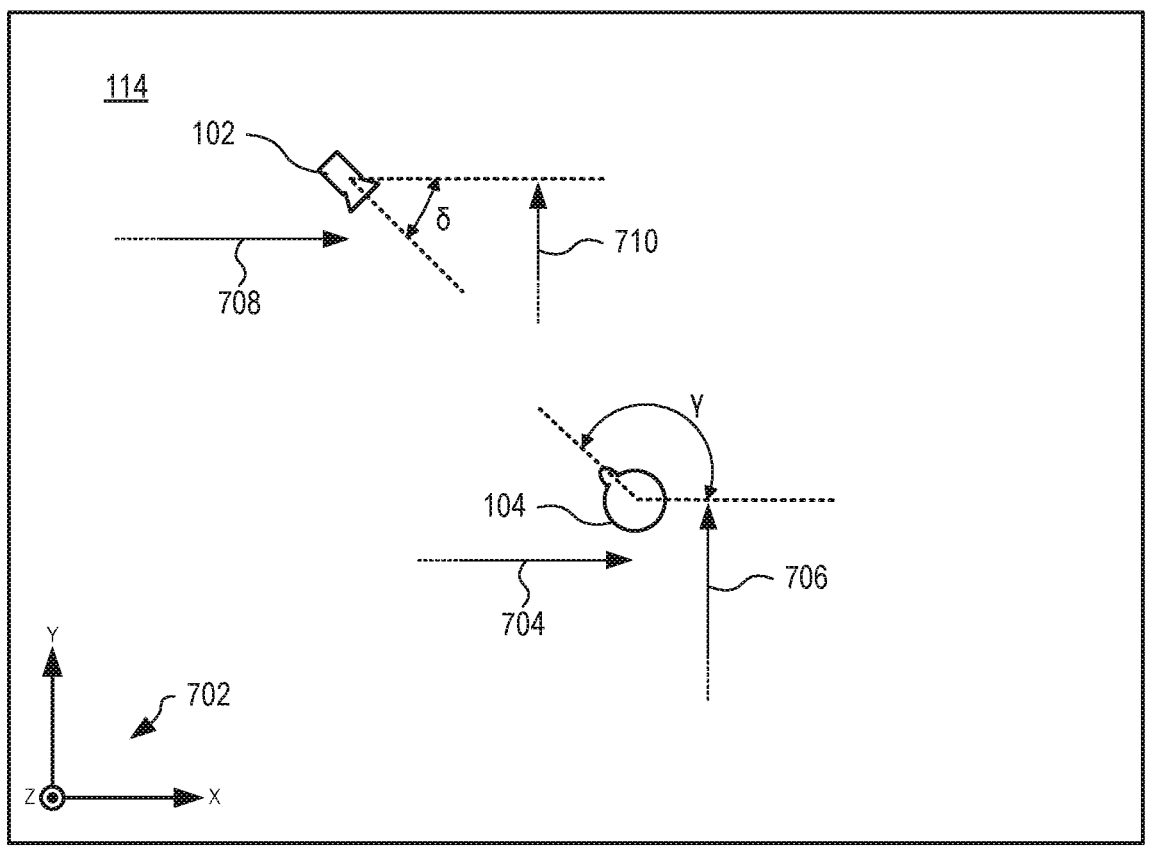
FIG. 7

SYSTEMS AND METHODS FOR TRACKING AND CONTROLLING A MOBILE CAMERA TO IMAGE OBJECTS OF INTEREST

CROSS-REFERENCE TO RELATED APPLICATIONS

The present application claims the benefit of priority from U.S. Provisional Application Ser. No. 62/464,281 filed Feb. 27, 2017, which is incorporated herein by reference in its entirety.

BACKGROUND

At televised sporting events, it is traditional to have many skilled and well-paid camerapersons operating under control of a director. The director assigns camerapersons to perform tasks such as following movement of a football, or of a specific player such as a wide receiver or a quarterback; traditionally this following relies on optical cues and is performed manually to keep the assigned character or ball centered in the field of view. The director cuts from one camera feed to another camera as appropriate to follow the action. The high labor requirements for multiple camera operators result in high costs, so that only higher levels of play, such as NFL or collegiate games, get televised. It would be desirable to reduce these costs.

Other sports pose similar issues to football. During foot or horse racing events, it is desirable to have at least one cameraperson keep the leader of the race in his camera's field of view, while others may keep a local favorite or the current second-place runner or driver in his field of view; the director may then select between camera feeds for broadcasting as the race develops.

There is also a market for videos of a specific player or racer in many sports for player coaching and player-marketing purposes, as well as personal vanity of individual participants. Similarly, there is a market for videos of specific actors or dancers for audition and training purposes. Camera views needed for such player or participant-specific videos may differ from those selected for broadcasting.

SUMMARY

A method for using tracking tags to control one or more mobile cameras to determine and capture a desired perspective of one or more objects of interest (OOI), includes locating each OOI and determining a first orientation of the OOI. A second location of the mobile camera is determined with a second orientation of the mobile camera; and method includes controlling, based upon the first and second location, and the first orientation, the mobile camera to maintain the desired perspective of the OOI despite movement of the OOI. The method executes on a system for controlling a mobile camera including a first tracking tag configured with the object and a second tracking tag configured with the mobile camera. A tracking apparatus having at least three receivers positioned around an operational area receives locate signals from the tracking tags to determine location data and a processor determines the movement plan for the mobile camera.

BRIEF DESCRIPTION OF THE FIGURES

FIGS. 5, 6, and 7 shows exemplary relationships that define a desired perspective, a field of view and the corresponding relative positions and orientations of the mobile camera and the OOI, in an embodiment.

DETAILED DESCRIPTION OF THE EMBODIMENTS

U.S. Pat. No. 8,780,204 titled "Systems and Methods for Analyzing Event Data" teaches how data from a tracking system may be analyzed to determine a current event or situation of interest, and is included as Appendix A for reference.

Figure 1:
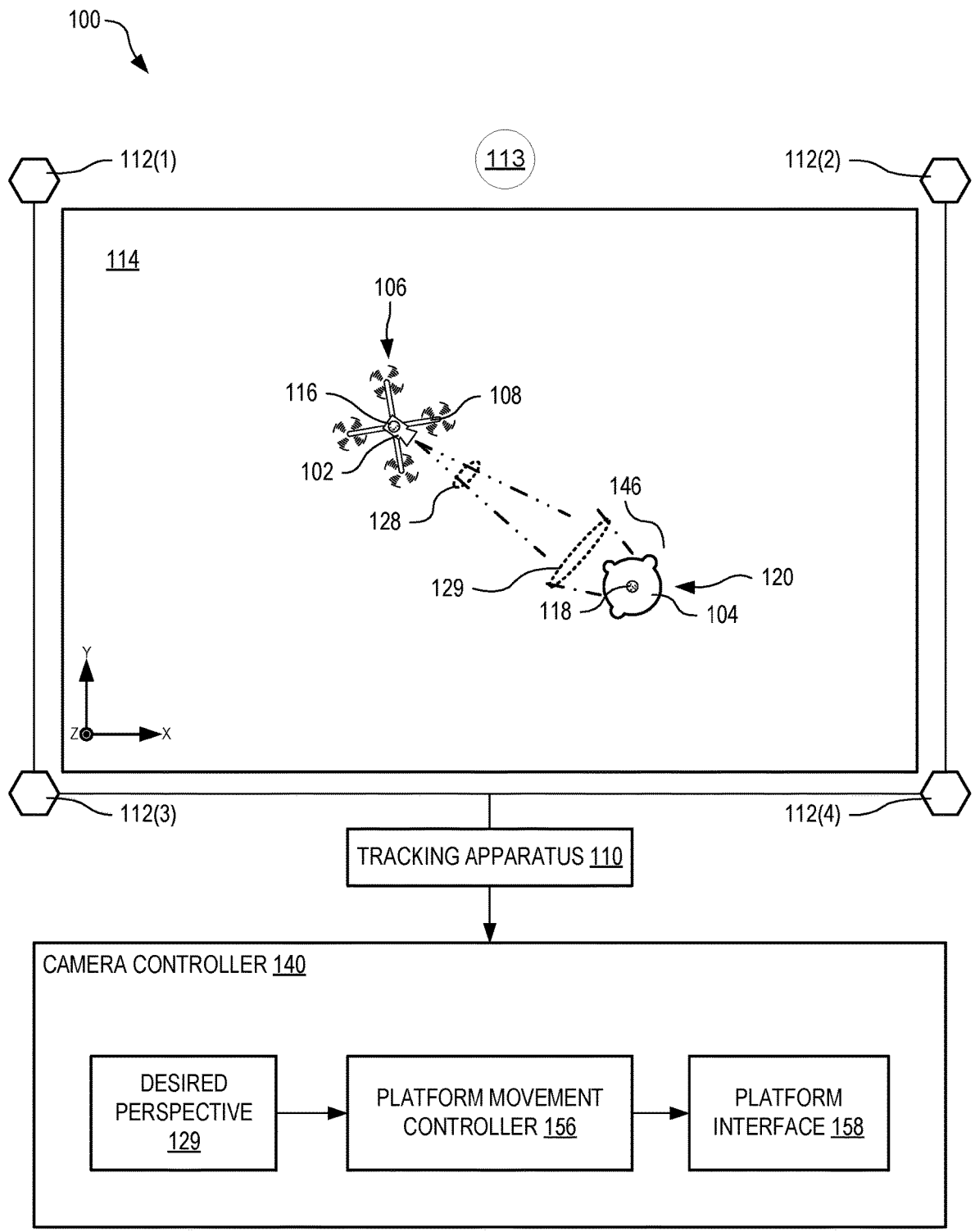
FIGS. 1 and 1A show one exemplary system for tracking and controlling a mobile camera to image an object of interest (OOI), in an embodiment.

FIG. 1 shows one exemplary system 100 for tracking and controlling a mobile camera 102 to image an object of interest (OOI) 104. In the example of FIG. 1, mobile camera 102 is mounted to a mobile camera platform 106 implemented as a drone 108.

While FIG. 1 illustrates one camera and one OOI, it will be understood that there may be multiple objects of interest (OOIs) and multiple mobile cameras assigned to follow each OOI during the same event. For example, during a football game, the quarterback, tight ends, wide receivers, and halfback are likely to handle the ball and are OOIs, potentially with two or three mobile cameras assigned to each with different desired perspectives. Further, the football itself may be a tracked OOI. In a hockey game, players and the puck may both be OOIs. In harness racing, each sulky may be an OOI. It should be further understood that that the OOI may represent multiple tracked objects such as identified as an event of interest. For example where a wide receiver and a defender race together down an American football field, they may be collectively identified as an OOI, and their orientation collectively determined, such that a mobile camera may be controlled to track their movement and position itself to capture a desired perspective of both players. Since illustrating a plethora of OOIs and cameras would unduly complicate the figures, while most of FIGS. 1-10 illustrate single mobile cameras and a single OOI it is understood that multiple OOIs are tracked and multiple cameras directed simultaneously, and the collision detector 1049 has importance in preventing collisions between the multiple cameras.

A tracking apparatus 110 is a computer that is communicatively coupled to a plurality of receivers 112 (four receivers 112(1)-(4) shown in the example of FIG. 1) positioned at known locations around an operational area 114. A first tracking tag 116 and a second tracking tag 118 are each configured to periodically, or aperiodically, emit a coded location signal (hereinafter referred to as a "ping") that is detected by three or more receivers 112. Receivers 112 are time synchronized and each receiver 112 reports a time of receiving the ping to tracking apparatus 110. Tracking apparatus 110 decodes the location signal to identify signals associated with each tracking tag and determines a location of the tracking tags within operational area 114 therefrom using a triangulation algorithm, as known in the art. Three or more receivers are sufficient to locate tracking tags in two dimensions. Where the operational area is not planar, four or more receivers are provided to locate each tracking tag in three dimensions. A time-sequence of location data becomes movement data, as known in the art. In some embodiments, additional movement data is obtained from accelerometers and gyroscopic sensors within each tracking tag.

First tracking tag 116 is attached to mobile camera 102 and second tracking tag 118 is attached to OOI 104. Tracking apparatus 110 uses first and second tracking tag to track location of mobile camera 102 and OOI 104 within operational area 114.

Mobile camera 102 is configured with a field of view 128 (represented as a dashed lines) and positioned and oriented (e.g., by control of drone 108) to capture a desired perspective 129 (represented as dashed lines) of OOI 104 at current location 120. OOI 104 may remain stationary, may remain at a certain location but change orientation, or as shown in FIG. 1, OOI 104 may follow a predictable path 124, moving to a current location 120 from a previous location 122 and then continuing movement to a next location 126.

Figure 1A:
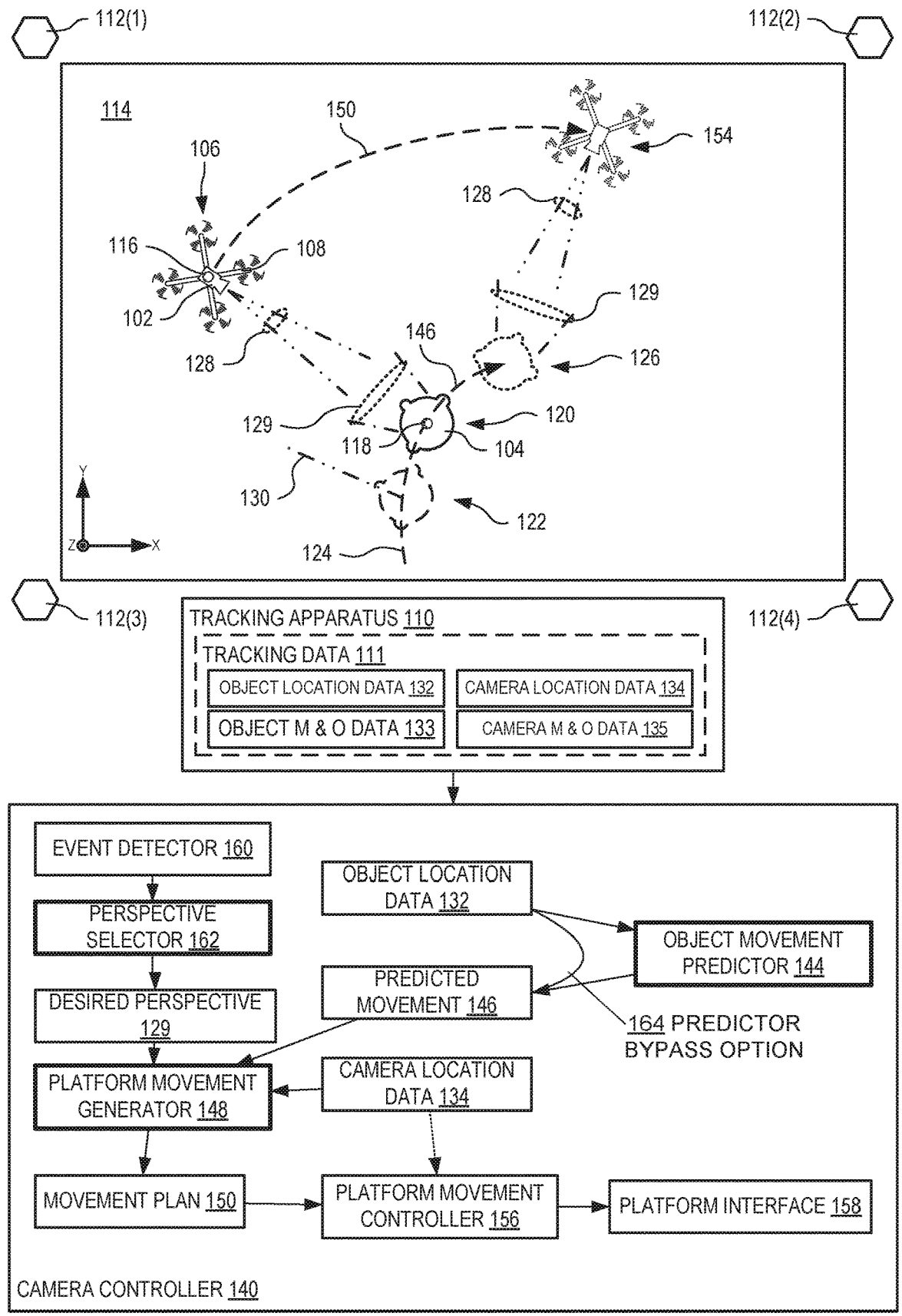

In the example of FIGS. 1 and 1A, desired perspective 129 is a front view of the face of OOI 104 where OOI 104 is a person. Desired perspective 129 is defined relative to location and orientation of OOI 104, and thus to capture desired perspective 129, the location and orientation of mobile camera 102 also needs to change as that of OOI 104 changes. As the orientation of OOI 104 changes (i.e., OOI 104 rotates), the desired perspective is maintained by changing the location and/or field of view 128 of mobile camera 102. Where OOI 104 is stationary (e.g., at location 120), based upon a determined orientation of OOI 104, mobile camera 102 is controlled and positioned to obtain and maintain desired perspective 129 of OOI 104. As OOI 104 moves to next location 126, rotating as shown in FIG. 1, mobile camera 102 is controlled to move to maintain desired perspective 129 relative to OOI 104, wherein mobile camera 102 reaches location 154 as OOI 104 reaches location 126.

Tracking apparatus 110 continually determines object location data 132 and object movement and orientation data 133 for tracking tag 118 (i.e., of OOI 104) and continually determines camera location data 134 and camera movement and orientation data 135 of tracking tag 116 (i.e., of mobile camera 102), collectively tracking data 111 hereinafter. Object movement and orientation data 133 and camera movement and orientation data 135 are provided to tracking apparatus 110 by tracking tags 118 and 116, respectively.

See FIGS. 2-4 and the associated description below for further details on tracking tags 116 and 118 and determination of movement and orientation data.

Figure 11:
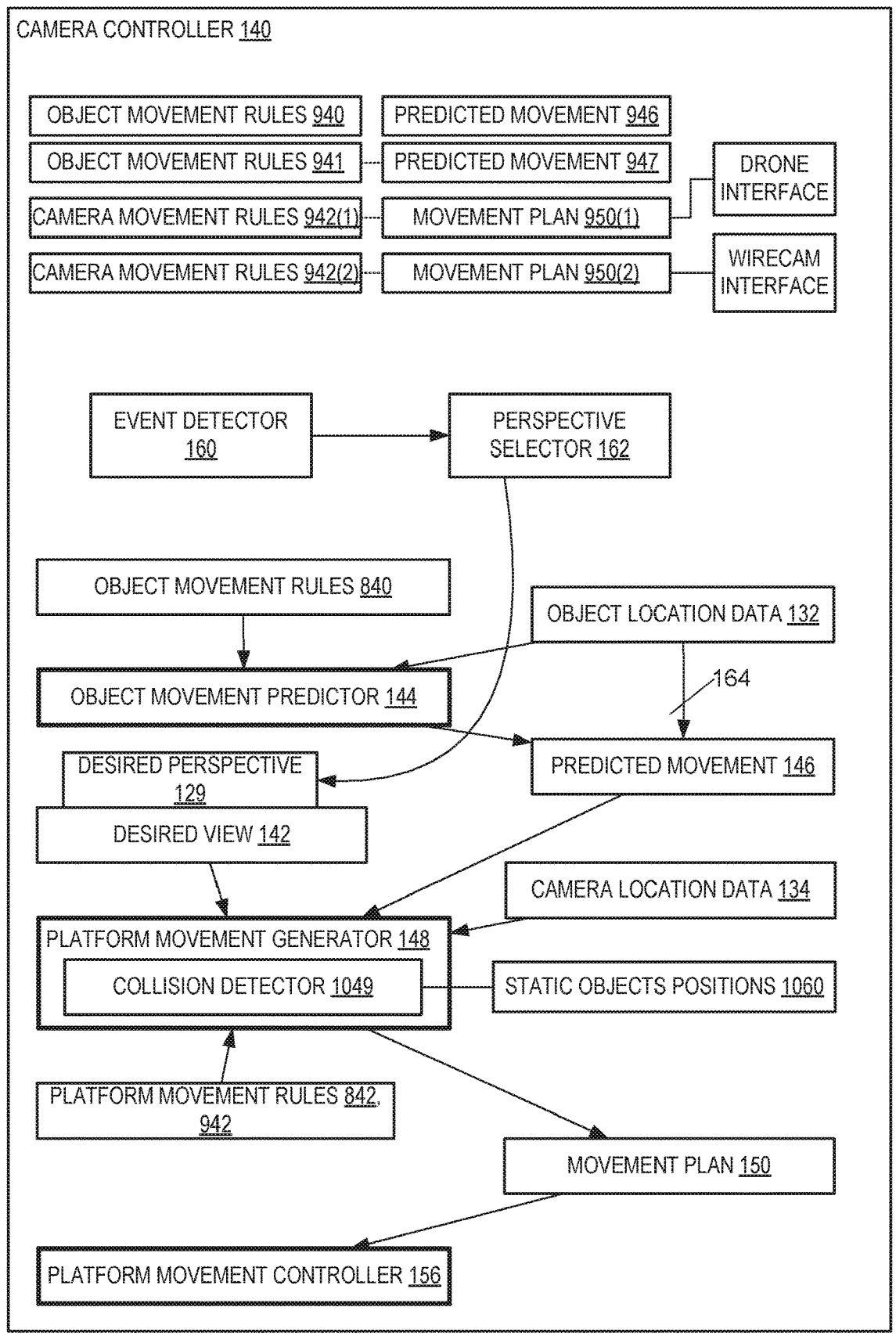
FIG. 11 is a more detailed block diagram of the camera controller of FIG. 1.

Tracking apparatus 110 sends tracking data 111 to a camera controller 140. Camera controller 140 is a computer (i.e., including a processor, memory, and machine-readable instructions) that controls movement of camera platform 106 such that mobile camera 102 is or becomes optimally positioned to maintain desired perspective 129 of OOI 104. In certain embodiments, camera controller 140 is implemented within tracking apparatus 110. In the example of FIGS. 1 and 1A, camera controller 140 controls drone 108 to position camera platform 106 based upon object location data 132, object movement and orientation data 133, camera location data 134, camera movement and orientation data 135, and desired perspective 129 of OOI 104. In the example of FIGS. 1 and 1A, desired perspective 129 specifies that mobile camera 102 is to capture a facial image of OOI 104, thus, drone 108 is controlled to position mobile camera 102 in front of, and facing, OOI 104 as shown in FIGS. 1 and 1A. FIG. 11 is a more detailed block diagram of on example of camera controller 140 that may be used with embodiments herein.

Figure 1B:
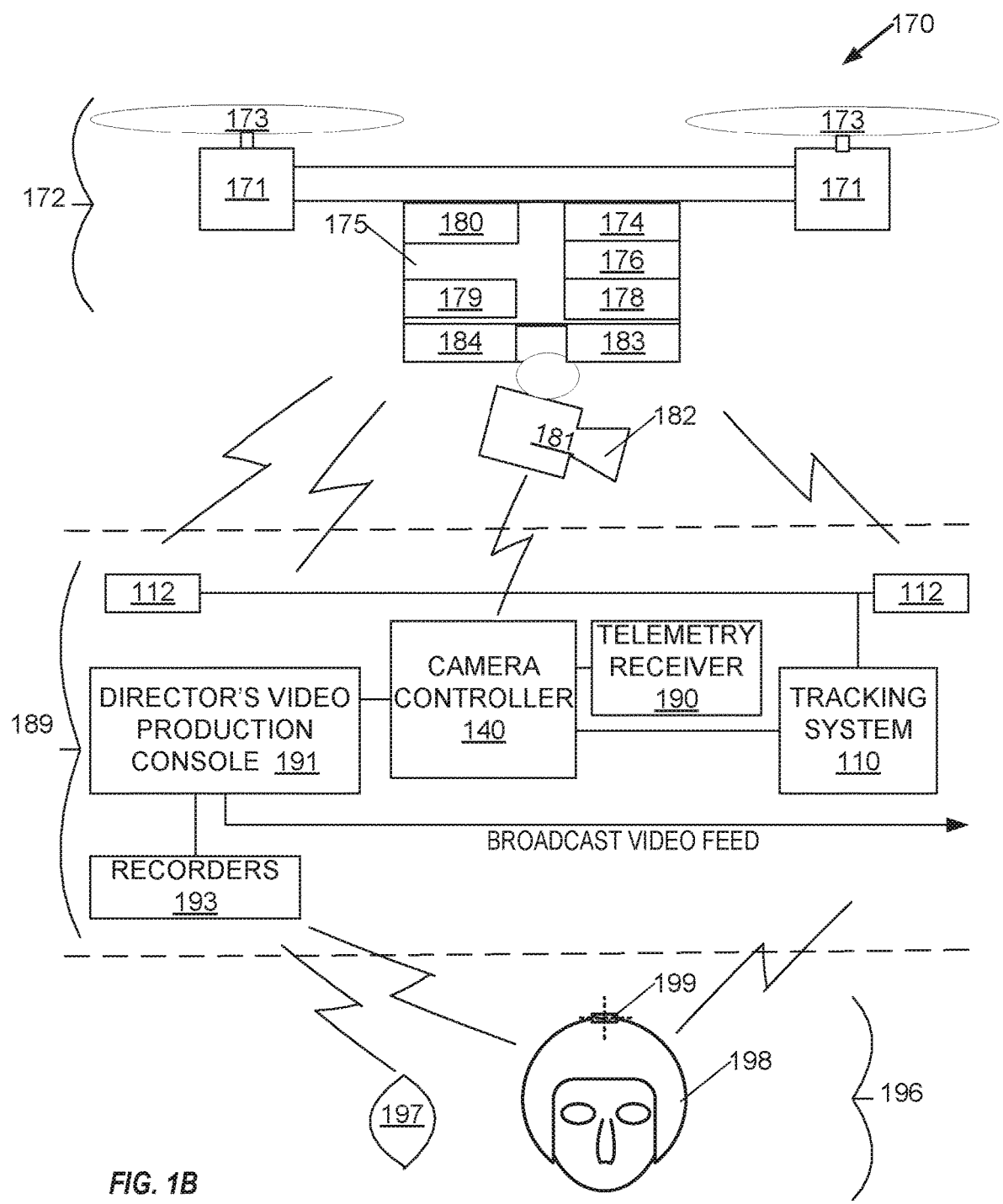
FIG. 1B is a schematic block diagram showing components of the system associated with a mobile camera, stationary hardware, and players having tracking tags.

FIG. 1B illustrates components of a video production system for sporting events, including components associated with a mobile camera unit 170, immobile components 189, and player 198-associated tracking tags 199. In this system, mobile camera units 170, of which there may be many in a system, include a drone 172. Drone 172 has lift motors 171, propellers 173 and an electrical unit 175 containing a flight battery 174, remote control receiver 176, GPS receiver 178, autopilot and local controller 180, and tracking tag 179. Mounted to drone 172 is a camera 181 with zoom lens 182, a video transmitter 183, and a camera angle controller 184 that permits rotation of camera 181 in at least tilt and in other embodiments additional axes relative to axes of drone 172. Camera angle controller 184 also includes digitizers configured to accurately measure relative angles of camera 181 to drone 172, permitting accurate computation of camera 181 orientation.

In an embodiment, instead of a single tracking tag 179, mobile camera drone has two or more spatially separated tracking tags 179A, 179B, which may be mounted beneath separate lift motors 171. Camera controllers 140 used with this embodiment are configured to determine drone orientation from separately-determined positions of tracking tags 179A, 179B. Advantageously, tracking apparatus 110 uses tracking tags 179A and 179B to determine both location and orientation of drone 172 very accurately, very responsively, and in real-time. Other methods of determining location and orientation of drone 172 may be used as a sanity check and/or to augment the location and orientation determined by tracking apparatus 110, and may be used as a fall back when tracking apparatus 110 is unable to determine one or both of orientation and location of drone 172.

During operation, mobile camera units 170 maintains radio contact with stationary components 189. Stationary components 189 include tracking receivers 112 associated tracking apparatus 110 that is configured to locate mobile camera unit 170 through radio emissions from mobile-camera-mounted tracking tag 179. A telemetry receiver 190, which may be integrated with tracking apparatus 110, receives radioed telemetry information, including flight battery 174 status and orientation information, from mobile camera unit 170. Tracking apparatus 110 and telemetry receiver 190 feed data to camera controller 140. Remote control signals from camera controller 140 are radioed to remote control receiver 176 of mobile camera unit 170, where they are coupled to control autopilot and local controller 180, camera angle controller 184, and zoom lens 182 permitting remote control of camera perspective in both angle and magnification. Video feeds from the cameras 181 of mobile camera units 170 are radioed to a Director's video production console 191, where each video feed may be viewed, and favored views selected for a current broadcast feed 192. Camera controller 140 is coupled to video production console 191, and may advise video production console of appropriate video feeds for viewing events detected on the field and appropriate for broadcast feed 192 as well as appropriate video feeds for recording as player-specific videos. Camera controller 140 is user-configurable to assign particular mobile cameras 170 to specific players or events, and to set desired perspective views of each. Both broadcast feed 192 and player-specific video feeds are provided to video recorders 193.

During operation, stationary units 189, and in particular tracking receivers 112, maintain radio contact with additional mobile items 196 such as a tracker built into football 197 and players 198 having tracking tags 199 so that camera controller 140 can direct mobile camera units 170 to maintain a view of these additional mobile items such as players 198 and football 197.

Object orientation is of interest in determining optimum perspective because it is considered desirable to have view a front or side of a player or runner rather than the player's backside. Further, when viewing a football player such as a receiver or quarterback, it is desirable to have magnification configured such that hands and face of the player are in view. If the tracking tag is positioned on a player's helmet, orientation of the helmet indicates an angle from which the face of that player could be seen assuming no obstructions, so a line can be constructed from the location of the tracking tag along the orientation of the helmet along which a camera could obtain a full-face view of the player. Similarly, additional lines can be drawn at desired angles offset from the orientation along which a camera could obtain a full profile view, or upon which a camera could obtain other specific views such as a 45-degree view. In embodiments, multiple desired camera angles may each be assigned to a separate camera, such that a director can select appropriate views of that player for a broadcast feed. Camera controller 140 therefore contains firmware configured to permit a director to configure the controller with a desired perspective for each player of a multiplayer game.

Camera controller 140 includes an object movement predictor 144 that processes object location data 132, as received from tracking apparatus 110, to determine a predicted movement 146 of OOI 104. For example, based upon predictable path 124 of OOI 104, as determined from previously received object location data 132, object movement predictor 144 extrapolates predictable path 124 to determine predicted movement 146 of OOI 104. Predicted movement 146 may define one or more predicted locations that OOI 104 is expected to pass through, together with is predicted orientation of OOI 104 at those locations. Where no movement of OOI 104 is predicted, predicted movement 146 indicates no movement of object 104.

Based upon predicted movement 146, camera location data 134, and desired perspective 129, a platform movement generator 148 generates a movement plan 150 for camera platform 106. Movement plan 150 defines movement of camera platform 106, over time, to maintain desired perspective 129, wherein mobile camera 102 is maintained in a position relative to OOI 104. For example, by following movement plan 150, camera platform 106 positions mobile camera 102 at location 154 when OOI 104 reaches location 126 such that mobile camera 102 captures desired perspective 129 of OOI 104.

Camera controller 140 may include a camera movement controller 156 that processes movement plan 150 in real-time and controls drone 108, based upon feedback within camera location data 134, to generate control signals for drone 108, such that camera platform 106 follows movement plan 150.

Movement plan 150 is updated as tracking data 111 is received from tracking apparatus 110 such that movement plan 150 predicts movement of OOI 104 as closely as possible. From a viewer's perspective, drone 108 appears to be "following" movement of OOI 104. However, to prevent mobile camera 102 from always being behind OOI 104, movement plan 150 necessarily predicts movement of OOI 104 such that drone 108 is positioned relative to OOI 104 to maintain desired perspective 129.

The camera controller 140 also has firmware adapted to configure limits on camera movement within a programmable operational area. Movement plan 150 is automatically adapted, such as by clipping the movement plan, to keep each mobile camera within the programmable operational area to prevent, for example, collision of a drone-mounted camera with a spectator in stands. In a particular embodiment, each independently mobile camera drone has an internal global positioning system (GPS) receiver 178 (FIG. 1B) and an autopilot and local controller 180. Autopilot and local controller 180 is programmed with limits of a current operational area prior to launch. If that drone is airborne and the GPS position as read by GPS receiver 178 is determined by the drone to exceed limits of the currently programmed operational area, or loses communication with the camera controller 140, the autopilot and local controller 180 will return the drone to a position within the operational area from which it was launched. In an embodiment, camera controller 140 monitors telemetry from battery monitor 1114 of each camera drone and recalls any camera drone having a low battery indication to the position from which it was launched prior to the drone running out of power; in a particular embodiment camera controller 140 replaces recalled drones with fresh drones having charged batteries.

In a particular embodiment, a player may wear two tracking tags, one on his helmet that can report orientation of the player's face, and a second on a portion of the player's torso; in particular embodiments more tracking tags may be worn. The tracking tag on the player's torso may provide orientation information useful in predicting movement and desired camera perspective of players, such as wide receivers in football or deep fielders in baseball, who may not always be looking in the same direction that they are moving while they attempt to catch a ball.

In an alternative embodiment, object movement predictor 144 is bypassed 164, with object movement predictor 144 simply passing current location and orientation through to predicted location and orientation 146; in this embodiment movement plan 150 is determined when movement of the object occurs and is those movements of camera platform 106 necessary to restore desired perspective 129.

Figure 2:
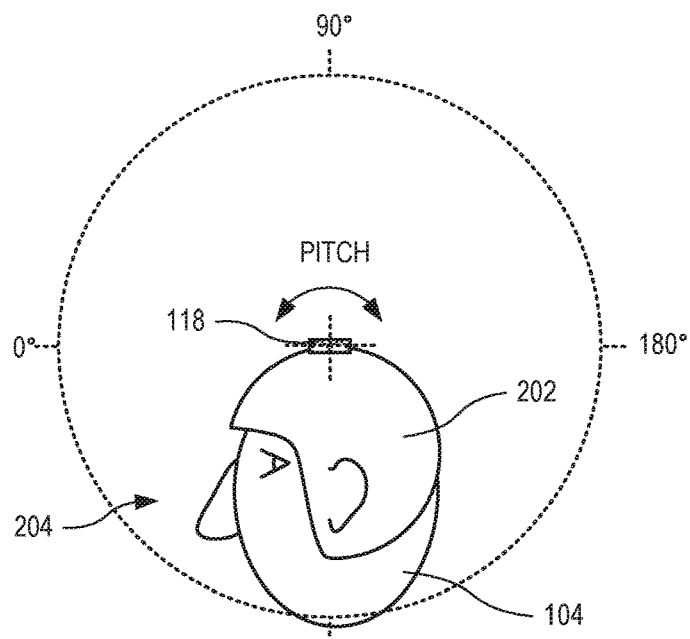
FIGS. 2, 3 and 4 show exemplary positioning of a tracking tag on a helmet, in an embodiment.
Figure 3:
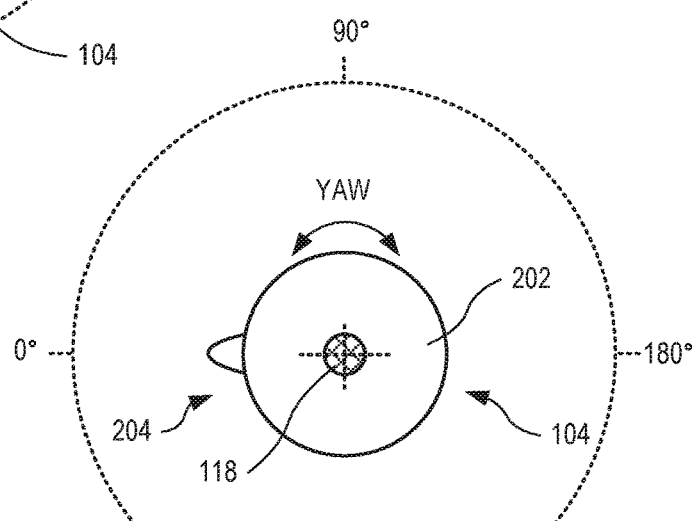
Figure 4:
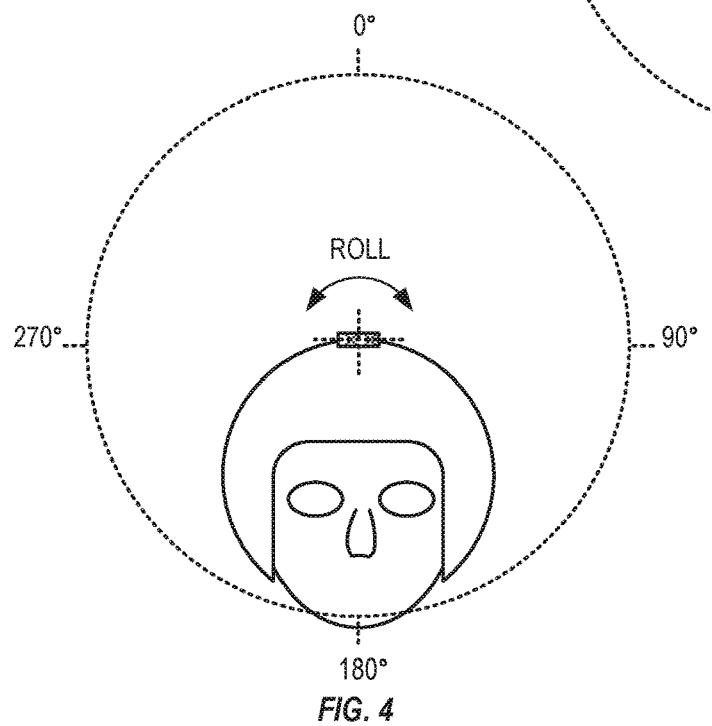
Figure 2A:
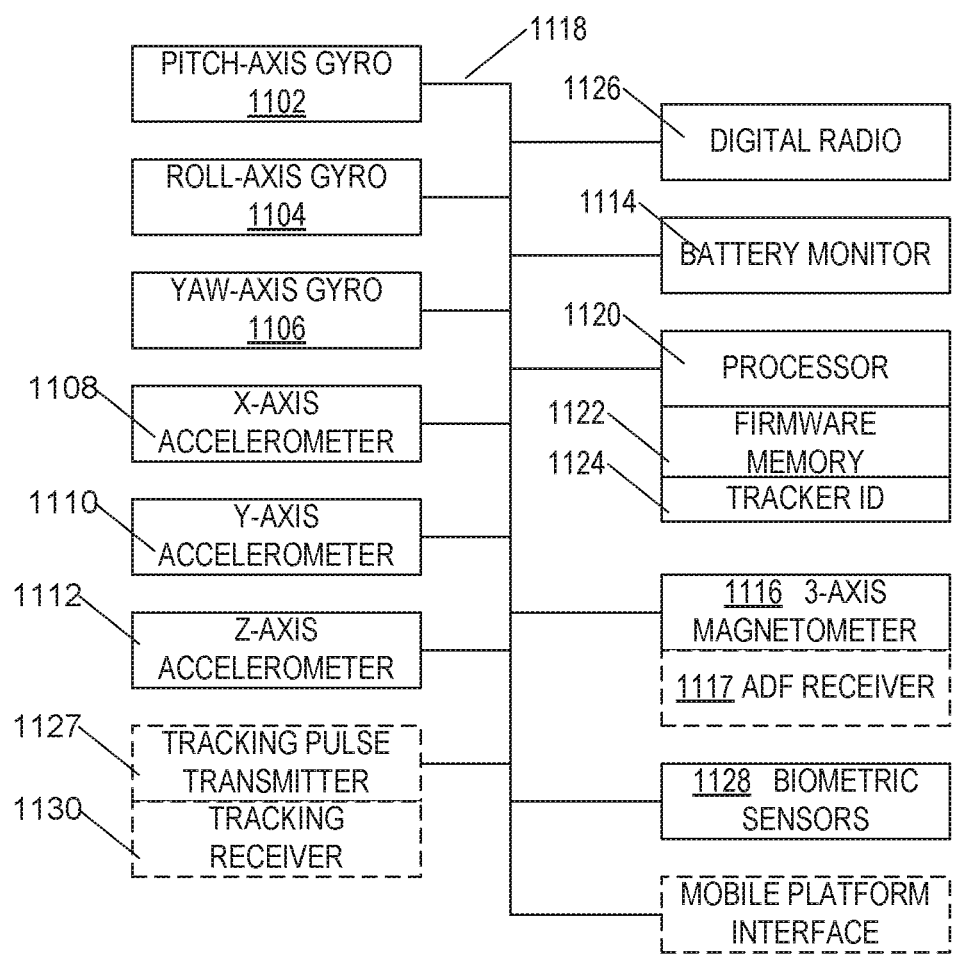
FIG. 2A is a block diagram of a tracking tag such as may be mounted on a helmet.

FIGS. 2, 3 and 4 show an exemplary positioning of tracking tag 118 such as may be used on a helmet 202 or mobile camera platform, where OOI 104 is an athlete participating in an American Football game, and FIG. 2A is a block diagram of an exemplary tracking tag 118.

FIGS. 2, 2A, 3 and 4 are best viewed together with the following description. Tracking tag 118 is configured with multiple sensors that include a three-axis gyroscope 1102, 1104, 1106, a three-axis accelerometer 1108, 1110, 1112, a battery monitor 1114, and a three-axis magnetometer 1116 (a magnetic compass). In an alternative embodiment, a radio beacon 113 is positioned outside the operational area 114, and each tracking tag 116, 118 incorporates automatic radio direction finder (ADF) 1117 apparatus configured as known in the radio art to determine a relative bearing of the beacon from the tracking tag. In this embodiment, camera controller 140 is adapted to receive the relative bearing and use a position of the tracking tag and a known position of the beacon 113 to calculate orientation of the tracking tag.

The sensors, including gyroscopes 1102-1106, accelerometers 1108-1112, battery monitor 1114, and magnetometer 1116 are coupled through a digital bus 1118 to a processor 1120 having firmware 1122 in a memory. Firmware 1122 includes machine readable instructions configured for execution on processor 1120 for reading data from sensors 1102-1116, compressing the data and labeling the data with a tracking tag identity 1124 stored in nonvolatile memory of the tracking tag before sending the labeled data on a digital radio 1126 as orientation telemetry data to a digital radio receiver in camera controller 140. In embodiments, digital radio 1126 is the same radio as that used by the tag to transmit locate pings, in other embodiments digital radio 1126 is a telemetry radio and a separate tracking pulse transmitter 1127 is provided that may operate on a different frequency than digital radio 1126. In some embodiments, biometric data, such as pulse rate, is obtained from biometric sensors 1128 and transmitted over digital radio 1126 to camera controller 140, where it may be recorded for later analysis or used to determine when players or racers are changing activity levels.

Alternative embodiments may incorporate alternative systems for locating tracking tags. In one alternative embodiment operating similarly to LORAN, the multiple receivers 112 are replaced with multiple pulse transmitters, and a single telemetry receiver is provided configured to receive signals from digital radio 1126 and provide data to camera controller 140. In this embodiment, pulses are transmitted by the multiple pulse transmitters with predetermined timing relationship, and a tracking receiver 1130 is provided with the tracking tag to receive pulses from, and measure timing relationships of, pulses from the multiple pulse transmitters; these timing relationships are processed to determine a location of the tracking tag. In another alternative embodiment, two or more beacon transmitters transmit a signal that encodes bearing from the transmitter to a receiver as do "VHF Omnirange" (VOR) signals commonly used for aircraft navigation. VOR signals, as received from beacons, provide an amplitude-modulated signal and a reference signal, where phase shift between the amplitude modulated and reference signals indicates a bearing from the transmitting beacon. In this embodiment, tracking receiver 1130 is configured to receive beacon signals and determine its bearing from two or more beacons; location is computed from known locations of beacons and these bearings.

Thus, tracking tag 118 with receivers 112 directly detects motion of helmet 202 and may also determine orientation and acceleration of helmet 202. For example, accelerometers may detect acceleration of tag 118 in each of three orthogonal axes, gyroscopes may detect rotation around each of the three orthogonal axes, and magnetometers may detect orientation of helmet 202 relative to the Earth's magnetic field. In the example of FIGS. 2, 3 and 4, positioning of tracking tag 118 within helmet 202 allows tracking tag 118 to determine movement and orientation of the athlete's head, thereby indicating a direction that the athlete is facing.

Where multiple tags are each attached to a different body part of the athlete, each tag provides an indication of movement and orientation of that body part, orientations of body parts for a single athlete may differ. For example, a wide receiver may be running in one direction while looking for an arriving football from a second direction—such as over his shoulder. Tracking tag 118 sends the determined acceleration and orientation data to tracking apparatus 110. Thus, tracking apparatus 110 determines a location of OOI 104 within operational area 114 and receives the acceleration and orientation data from tracking tag 118 as telemetry data. Continuing with the example of FIGS. 2-4, based upon movement and orientation information received from tracking tag 118, tracking apparatus 110 may determine whether the athlete is looking up or down, left or right, and so on; similarly a tracking tag located on the athlete's belt may determine an orientation and direction in which the athlete is running. For athletes wearing both body and head orientation tags both orientation of head and orientation of body are input to an event detector 160 and object movement predictor 144 to improve prediction and to permit selection of an appropriate perspective for viewing that athlete.

In an alternative embodiment, paired tracking tags may be mounted on opposite sides of a same portion of a player's anatomy, such as on opposite hips, belt buckle and small of the back, or on opposite shoulders. In this embodiment, orientation of the player may be determined by tracking controller 140 from precise locations of each of the paired tags as determined by tracking apparatus 110. Camera controller 140 may further enhance the location and orientation determined from paired tracking tags using movement and orientation information received from tracking tag 118, for example.

In alternative embodiments, tracking tag 118 is mounted not on an athlete, but on other objects of interest, such as a ball for sports such as American football or soccer, a hockey puck for hockey, or a sulky, racing shell, or race car for racing, or even on a bull for bullfighting events.

FIGS. 5, 6, and 7 shows exemplary relationships that define desired perspective 129, field of view 128 and the corresponding relative positions and orientations of mobile camera 102 and OOI 104. In the example of FIG. 5, for a defined field of view 128 of mobile camera 102, as a camera position relative to the OOI and a camera orientation. For example, a range 504 and an angle α relative to a facing direction (indicated by line 502) of OOI 104 define a location for mobile camera 102 relative to OOI 104, and a reciprocal of angle α and an offset angle β define an orientation of mobile camera 102 to capture a desired image 602 of OOI 104. In the example of FIGS. 5, 6 and 7, offset angle β moves the position of OOI 104 within image 602. For example, where OOI 104 is a leader in a race, by offsetting the position of the leader or changing magnification, other racers may also be included.

In a particular embodiment, in addition to controlling position and orientation of multiple mobile cameras 102, camera controller 140 controls a zoom or magnification feature of mobile camera 102 such that the perspective, including size and position of images obtained, of a leader in the race can be maintained. In an embodiment, multiple athletes are tracked by configuring each player with a tracking tag, such as by placing a tracking tag in each athletes' helmet. In this embodiment, event detector 160 of camera controller 140 determines whether a second runner or vehicle in a race is near the leader in the race. If there is no racer close to the leader, the perspective selector 162 of the camera controller selects a first perspective to moves position, orientation, and magnification, of camera 102 to maintain a desired size and position of the leader, and sets this perspective as desired perspective 129. When there is another racer close to the leader, an expert system method of the camera controller perspective selector 162 modifies the desired perspective 129 to move position, orientation, and magnification of at least one camera 102 to show both the leader and the racer closest to the leader as an expert cameraman would. Since most racers in race events travel in the same direction, in an embodiment the orientation of racers may in some embodiments be assumed to be in their direction of movement and not measured separately by the tracking tag. In these embodiments, the tag-based magnetometer or ADF and accelerometers may be omitted.

Figure 12:
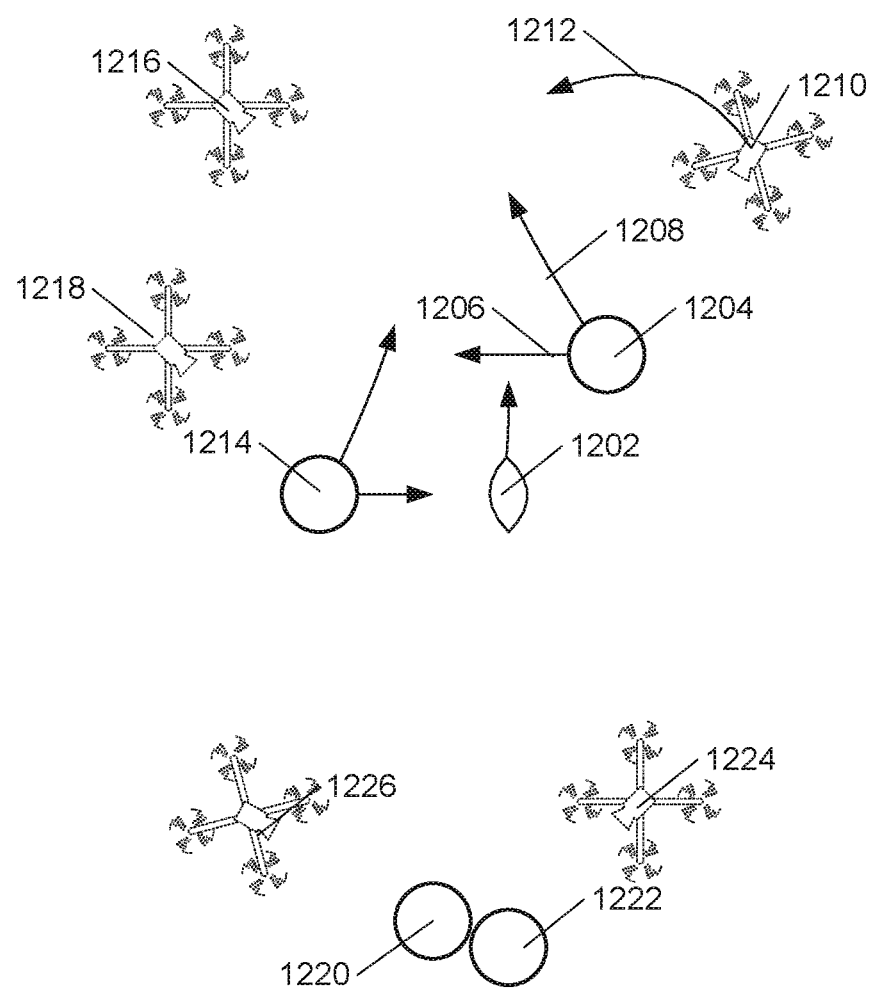
FIG. 12 is a schematic representation of events that may happen on a football field, illustrating factors considered by the event detector and operation with multiple mobile cameras and objects of interest.

In another embodiment configured for sports, event detector 160 includes firmware comprising machine readable instructions for applying expert system rules to determine likely and actual events. In an embodiment configured for football, for example, in the event a football 1202 (FIG. 12) is detected moving in a trajectory at high velocity independent of any player, and a player 1204 is determined to have a face oriented 1206 to give a view of the football while moving along a trajectory 1208 that will intercept the trajectory of the football, an impending receiver catch or interception (depending on which team that player belongs to) may be determined. In the event an impending receiver catch is determined, perspective selector 162 may set a perspective for a camera 1210 following player 1204 that offers a wider field of view of that player and adjust perspective angle to include a view of the arriving football 1202 as well as a view of the player. This change of perspective may require movement of camera 1210, such as along arc 1212. Similarly, detection of a football moving at the same speed and direction as, and location near, a player's location may determine either a rushing event or a successful reception of the ball; in either event the event detector 160 will signal perspective selector 162 to adopt an appropriate perspective of the ball-carrying player until an impending tackle is determined. An impending tackle is determined when predicted positions of a ball-carrying player, or a player 1204 involved in an impending receiver catch, and player 1214 of an opposing team intersect, and event detector 160 signals perspective selector 162 to adopt a perspective for a camera 1216 previously following one of the players 1214 to include a view of both players 1204, 1214, which may include alterations to both desired magnification and camera angle. There may be more cameras 1218 in the area of the event. Multiple events may be detected simultaneously on a football field, for example as illustrated in FIG. 12, an impending reception by a player 1204 of football 1202 may be detected as a defensive player 1220 slams into the quarterback 1222 who just threw the football 1202. When multiple simultaneous events are detected on the field, mobile cameras nearest each event are typically assigned to cover those events, for example cameras 1210 and 1216 covering the impending reception and impending tackle while cameras 1224 and 1226 cover roughing or sacking of the quarterback. Intersection of defensive player 1220 and quarterback 1222 may be detected as quarterback roughing or a quarterback sack, with nearby mobile cameras 1224 and 1226 that had been assigned to follow quarterback 1222 and defensive player 1220 having perspective adjusted—likely by zoomout—to view both defensive player 1220 and quarterback 1222. When two or more players and football are in close proximity having collided or on converging trajectories, event detector 160 may signal perspective selector 162 to select a broader view of the involved players. Thus, desired perspective 129 may be updated based upon detected events and changes in those events and may include one or more tracked objects (i.e., players, balls, and so on). In certain embodiments, multiple tracked OOI may be grouped (e.g., based upon detected events) and considered as a single OOI for purposes of determining desired perspective 129. It is expected that many more events may be detected, with more complex rules, than the example rules indicated in this paragraph. It is expected that occasionally player's heads may turn towards events whether they are part of the event, such as a receiver about to catch a long pass, or not; head orientation may be used by event detector 160 to identify events.

In a particular embodiment, upon detection of high priority events such as an impending touchdown, reception, or tackle, a mobile camera may be reassigned temporarily to provide a desired perspective of the event, rather than a specific player participating in the event; after the event that mobile camera is reassigned to its former role. Typically such events involve multiple players and require less magnification than following single players while running to include the multiple players closest to the ball, magnification is set to provide a field of view that includes several players close to the ball. Since each player has different orientation and position, an event may be assigned to an average position of ball and players participating in the event, and an orientation according to average movement of the ball and players.

In alternative embodiments configured for use in other sports, such as soccer, baseball, or basketball, event detector 160 is configured with expert system rules adapted for those other sports.

FIG. 7 shows OOI 104 and mobile camera 102 within operational area 114 as tracked by tracking apparatus 110 of FIG. 1. Tracking apparatus 110 defines a reference location and orientation 702 for operational area 114 and determines location of camera 102 and OOI 104 using these coordinates. FIG. 7 is a 2-D representation of a three dimensional space, where the Z-axis is perpendicular to the page and an angular reference is aligned with the X axis. Although the example of FIG. 7 shows only angles γ and δ relative to the x-axis reference of orientation 702, since operational area 114 is three dimensional, an additional angle relative to the X-Y plane (e.g., an altitude angle) may be used.

In the example of FIG. 7, tracking apparatus 110 uses tracking tag 118 to determine that OOI 104 is at an X-Y location defined by arrows 704, 706, relative to reference location and orientation 702, and that OOI 104 has an orientation indicated as angle γ relative to the x-axis. As noted above, an additional angle may also be provided for an altitude angle where orientation of OOI 104 is not parallel to the X-Y plane.

Similarly, tracking apparatus 110 uses tracking tag 116 to determine that mobile camera 102 is at an X-Y location defined by arrows 708, 710, relative to reference location and orientation 702, and that mobile camera 102 has an orientation indicated as angle δ relative to the x-axis. As noted above, an additional angle may also be provided for an altitude angle where orientation of mobile camera 102 is not parallel to the X-Y plane.

Tracking tags 116 and 118 are not necessarily aligned with reference location and orientation 702, and thus the orientation information received by tracking apparatus 110 from tracking tags 116, 118 may use another orientation reference.

Figure 8:
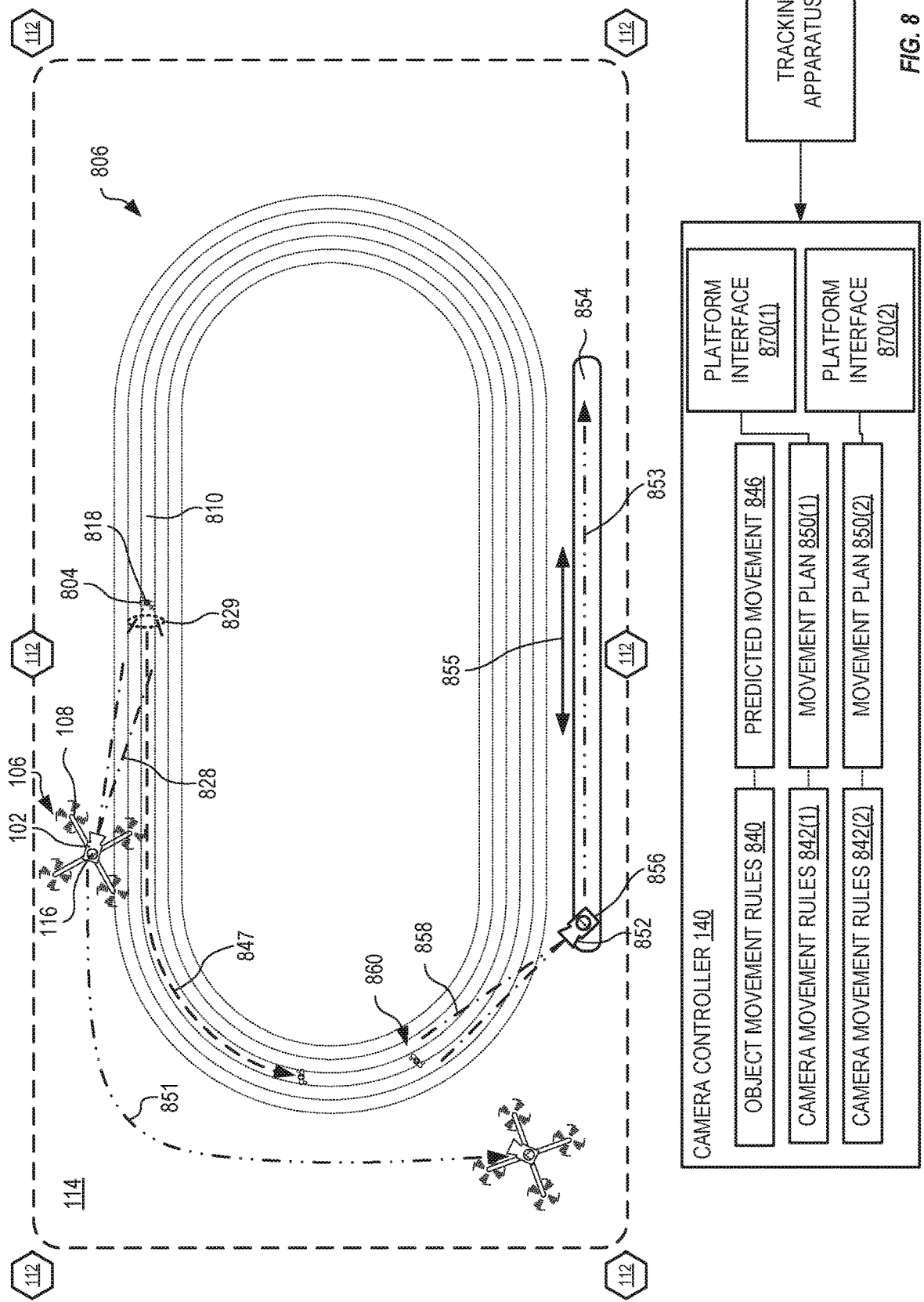
FIG. 8 shows exemplary use of the system of FIG. 1 for tracking an athlete running within a lane of a running track and for the controlling drone to position the mobile camera to capture a desired perspective of the athlete, in an embodiment.

For example, where tracking tags 116, 118 determine orientation using a three-axis magnetometer (as described above), the orientation received from tag 118 may be relative to the Earth's magnetic field, wherein tracking apparatus 110 converts the received orientation to be relative to reference location and orientation 702. FIG. 8 shows exemplary use of system 100 of FIG. 1 for tracking an athlete 804 running within a lane 810 of a running track 806 and for controlling drone 108 to position mobile camera 102 to capture a desired perspective 829 of athlete 804. The plurality of receivers 112 are positioned around operational area 114 to include running track 806. As with the example of FIG. 1, drone 108 provides mobile camera platform 106 for mobile camera 102, which is configured with tracking tag 116 such that tracking apparatus 110 tracks the location and orientation of mobile camera 102. A tracking tag 818 is attached to athlete 804 and thus the location (and optionally the orientation) of athlete 804 is also tracked by tracking apparatus 110.

In the example of FIG. 8, a second mobile camera 852 is mounted on a rail cam platform 854, of the type that provides linear movement to camera 852 in a direction parallel to a straight of running track 806 as indicated by arrow 855. Camera 852 is configured with a tracking tag 856 such that the location and orientation of camera 852 is also tracked by tracking apparatus 110.

For each of athlete 804 and mobile cameras 102 and 852, tracking apparatus 110 determines tracking data 111 (e.g., object location data 132, object movement and orientation data 133, camera location data 134, and camera movement and orientation data 135) from tracking tags 116, 856, and 818, and sends tracking data 111 to camera controller 140. In alternative embodiments, rail cam locations and orientations are determined by digital encoders directly monitoring camera position and orientation, by counting pulses provided to stepping motors and determining position therefrom, or monitoring movements of cable-drive pulleys or wheels.

Camera 852 and rail cam platform 854 are also controlled by camera controller 140.

In the example of FIG. 8, since athlete 804 is running within lane 810 of running track 806, an expected path of the athlete is known. Information of this path is stored as object movement rules 840 within camera controller 140. In this example, object movement rules 840 define the path of lane 810 relative to operational area 114, for example. Using object movement rules 840 and object location data from tracking apparatus 110, object movement predictor 144 determines predicted movement 846, illustratively shown as dashed line 847. For example, predicted movement 846 is based upon a current running speed of athlete 804.

Platform movement generator 148 then generates a movement plan 850(1) (illustratively shown as dashed line 851) for mobile camera 802 based upon desired perspective 829, field of view 828, and predicted movement 846. Movement plan 850(1) defines movement of camera platform 106 to maintain camera 802 in a position relative to athlete 804 such that camera 802 may capture the desired perspective 829 of athlete 804.

Similarly, platform movement generator 148 generates a movement plan 850(2) (illustratively shown as dashed line 853) for mobile camera 852 based upon desired perspective 829, field of view 858, and predicted movement 846. Movement plan 850(2) defines movement of rail cam platform 854 to maintain camera 852 in a position relative to athlete 804 such that camera 852 may capture the desired perspective 829 of athlete 804. However, camera movement rules 842(1) define the limited movement available to camera 852 such that movement of camera 852 may not be invoked until athlete 804 is "within range" of camera 852. In one embodiment, movement plan 850 defines movement of each movement event for the corresponding camera platform with a time such that the movement event is not executed until that time. For example, based upon the speed and location of athlete 804, movement plan 850(2) may define movement events that have an associated time of occurrence, wherein at the appropriate time, the movement events are executed to control movement of camera 852.

Figure 9:
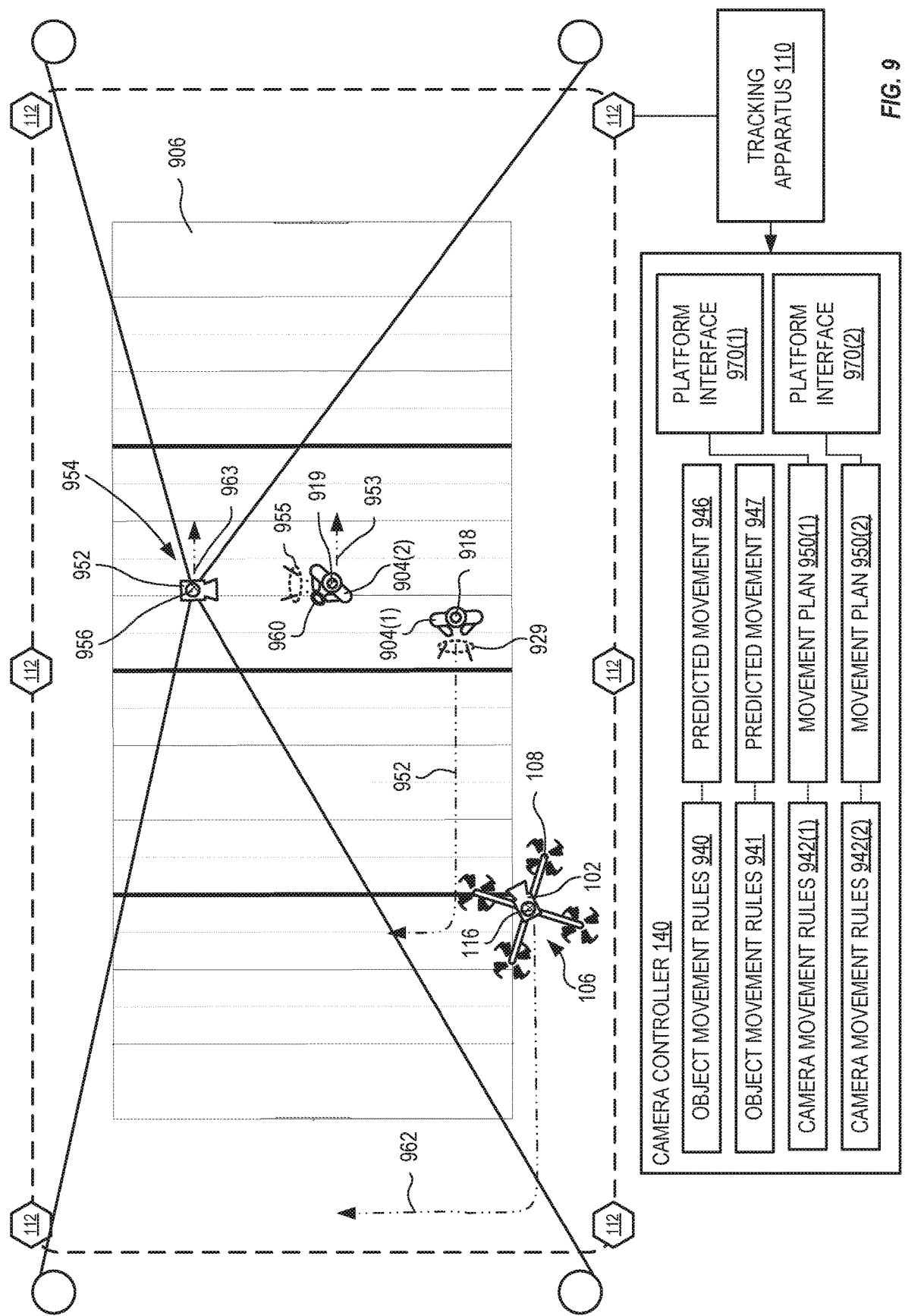
FIG. 9 shows exemplary use of the system of FIG. 1 for tracking football players on a football field and for controlling the drone to position the mobile camera to capture a desired perspective of one football player, in an embodiment.

FIG. 9 shows exemplary use of system 100 of FIG. 1 for tracking multiple football players 904 on a football field and for controlling drone 108 to position mobile camera 102 to capture a desired perspective 929 of one particular football player 904(1) (e.g., a wide receiver). Multiple receivers 112 for locating pings are positioned around operational area 114 to include football field 906. As with the example of FIG. 1, drone 108 provides mobile camera platform 106 for mobile camera 102, which is configured with tracking tag 116 such that tracking apparatus 110 tracks the location and orientation of mobile camera 102. One or more tracking tags 918 are attached to player 904(1) and the location (and optionally orientation) of player 904(1) is also tracked by tracking apparatus 110.

In an embodiment, in addition to controlling position and orientation of mobile camera 102, camera controller 140 controls a zoom feature of mobile camera 102 such that a desired perspective 829 of a player can be maintained. In an embodiment, multiple athletes and objects—such as footballs—are tracked by placing tracking tags in the objects as well as on athletes' helmets. An expert system in object movement predictor 144 determines a state of the game, such as a catch of ball by quarterback, a throw by quarterback, or an impending catch by a receiver is likely, and adjusts desired perspective 829 as an expert cameraman would. For example, if a tracking tag in a football is moving rapidly and independently of any player, and predicted movement of the football and predicted movement of an eligible receiver indicate possibility of a catch, a desired perspective will be determined for the camera that will be a distant or low magnification view showing both ball and player, as ball approaches player the perspective will be a closer or higher magnification view, and as ball reaches the player the perspective will be a closeup or high magnification view intended to show resulting catch, interception, or fumble.

In the example of FIG. 9, a second mobile camera 952 is mounted on a wire-cam platform 954, of the type that provides 3D movement of camera 952 within operational area 114. Wire-cam platform 954 (e.g., SkyCam™, FlyCam™) is becoming well known in the American NFL for providing "on-field" and "aerial" views of players on the football field. Camera 952 is configured with a tracking tag 956 such that the location and orientation of camera 952 is also tracked by tracking apparatus 110. In certain embodiment, accurate tracking information for camera 952 is sent to an image-enhancing tool such that images captured by camera 952 may be augmented (e.g., with the Yellow Line and other such graphics that are overlaid onto images of football field 906).

For each of players 904 and mobile cameras 102 and 952, tracking apparatus 110 determines orientation information (e.g., object location data 132, object movement and orientation data 133, camera location data 134, and camera movement and orientation data 135) from tracking tags 116, 918, and 956, and sends this location and orientation information to camera controller 140. In alternative embodiments, one or more of mobile camera 952 locations and orientations are determined from calculations based upon digital encoders directly monitoring movements of cable-drive pulleys or wheels, or by counting pulses provided to stepping motors driving cable-drive pulleys or wheels.

Camera 952 and wire-cam platform 954 are also controlled by camera controller 140.

In the example of FIG. 9, player 904(1) is a wide receiver and player 904(2) is a quarterback carrying a football 960. Other players and officials are not shown for clarity of illustration. Object movement rules 940 define possible movements of player 904(1), such as a run towards and end zone followed by a cut to the right, and are of use in object movement predictor 144 for predicting movement of the player. Similarly, object movement rules 941 define possible movements of player 904(2), such as a retreat once the ball is snapped, and are also used in predicting movement of the player 904(2). Object movement rules 940, 941 may each define multiple movements, where, based upon detected movements of other players (e.g., aggregate motion) and/or football 960, and/or identified formations of players based upon tracked locations, camera controller 140 selects a most probable movement for each player 904. For example, based upon a detected formation of one or both of offence players and defense players, camera controller 140 determines that player 904(1) is likely to make a run down football field 906 towards the end zone and then make a sharp cut to the right, and the player 904(2) will drop back after football 960 is snapped from the line of scrimmage, and then throw football 960 to player 904(1). Based upon athletic performance (i.e., measured running speed, agility, and determined fatigue) of player 904(1), object movement predictor 144 generates predicted movement 946, illustratively shown as dashed line 953 and generates predicted movement 947, illustratively shown as dashed line 962.

Camera movement rules 942(1) that define movement restrictions and/or limitations of camera platform 106 and camera movement rules 942(2) define movement restrictions and/or limitations of camera platform 954. For example, camera movement rules 942 may define areas that the corresponding platform cannot enter, and may define movement speed, acceleration limitations and so on.

Based upon desired perspective 929 for player 904(1) and predicted movement 946(1), platform movement generator 148 generates movement plan 950(1), illustratively shown as dashed line 962, for platform 106. Similarly, based upon desired perspective 955 for player 904(2) and predicted movement 946(2), platform movement generator 148 generates movement plan 950(2), illustratively shown as dashed line 963, for platform 954.

Camera controller 140 includes one or more platform interfaces 970 interfacing with camera platforms. In the example of FIG. 9, camera controller 140 includes platform interface 970(1) for controlling movement of platform 106 (i.e., drone 108) based upon movement plan 950(1) and includes platform interface 970(2) for controlling movement of platform 954 (i.e., the wire-cam). Camera controller 140 may include other platform interfaces 970 without departing from the scope hereof. For example, camera controller 140 may include a platform interface 970 for controlling a ground based vehicle providing a platform for a mobile camera.

Figure 10:
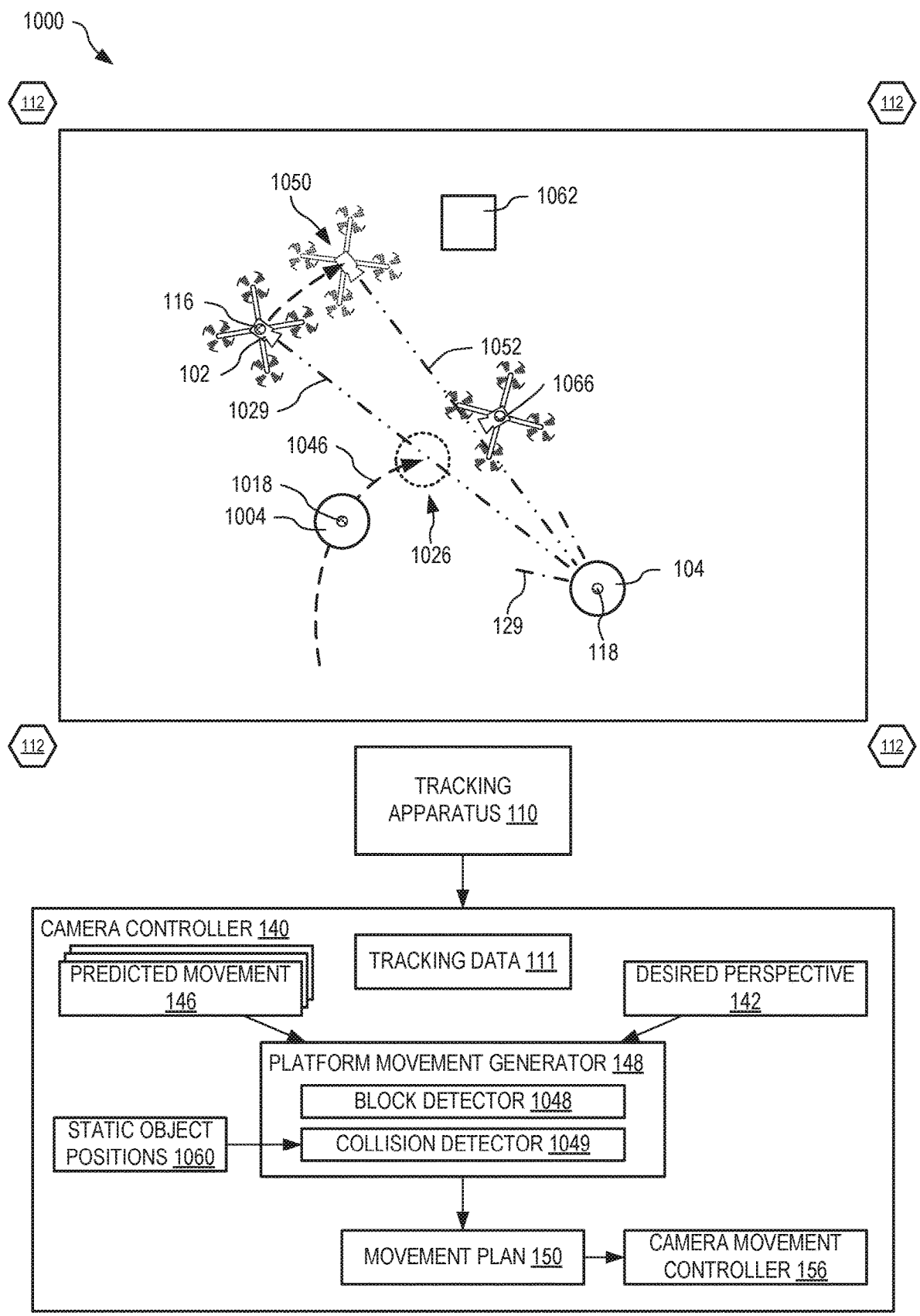
FIG. 10 is a schematic illustrating exemplary control of the mobile camera of FIG. 1 to prevent the desired perspective from being blocked by another object.

FIG. 10 is a schematic illustrating exemplary control of the mobile camera of FIG. 1 to prevent the desired perspective from being blocked by another object. In the example of FIG. 10, camera 102, tracked using tracking tag 116, is positioned to capture a desired perspective 129 of OOI 104. Object movement predictor 144, based upon tracking data 111 from tracking apparatus 110, determines predicted movement 146 for each of OOIs 104 and 1004. Accordingly, as described above, platform movement generator 148 generates movement plan 150 to maneuver camera 102 to maintain desired perspective 129 of OOI 104.

Platform movement generator 148 includes a block detector 1048 that processes predicted movement 146 for OOIs 104, 1004 and movement plan 150 to determine whether OOI 1004 would block 129 mobile camera 102 of desired perspective 129 of OOI 104, or of any of a group of OOIs that may be involved in an event. Where block detector 1048 detects that OOI 1004 blocks desired perspective 129, block detector 1048 adjusts camera movement plan 150 such that camera 102 is maneuvered to prevent the blockage while maintaining desired perspective 129 as closely as possible. For example, mobile camera 102 may ascend to clear its field of view or move to a position 1050 where it has a clear view of OOI 104. In the example of FIG. 10, OOI 104 is stationary and OOI 1004 has predicted movement 146 to follow path 1046 such that OOI 1004 blocks line of sight 1029 of mobile camera 102 to capture desired perspective 129 of OOI 104. Accordingly, block detector 1048 and/or platform movement generator 148 adjusts movement plan 150 such that mobile camera 102 is maneuvered and orientated to position 1050, thereby maintaining an unblocked line of sight 1052 of OOI 104 that is close to desired perspective 129.

It is not just players that may obstruct a mobile camera's view of an OOI, other cameras may also obstruct vision. For example, a mobile camera such as camera 1066 may, while maintaining a desired perspective of OOI 1004, may pass through a field of view of another camera 102. To prevent this type of block, block detector 1048 adjusts one or both camera movement plans 150, such as by lowering one camera and raising another camera, to maintain clear lines of sight from both cameras to the OOIs. Adjustment of the camera movement plans to maintain clear lines of sight is referred to herein as coordinating camera movement to maintain clear lines of sight.

Sports are often multiplayer events, and it can be desirable to have multiple perspectives available of players, both of these factors make it desirable to use more than one mobile camera at a sporting event. In order to prevent collisions between these multiple cameras with each other and with players, platform movement generator 148 may also include a collision detector 1049 that processes movement plan 150 with current and planned positions of other camera platforms, positions of players, and static object positions 1060 to determine whether mobile camera 102 will collide with another object such as a player, or a stationary object 1062 within operational area, and to adjust the movement plans to avoid collisions; such adjustment is referred to herein as coordinating the movement plans to avoid collisions. Static object positions 1060 defines the location of non-moving structure and objects within operational area 114, such that collision detector 1049 may determine whether movement plan 150 would cause a collision with stationary object 1062. When a possible collision is detected, collision detector 1049 adjusts movement plan 150 to prevent mobile camera 102 (i.e., the drone in this example) from hitting stationary object 1062. Collision detector 1049 may also process predicted movement 146 for other OOIs 104, 1004 and movement plans 150 to detect and avoid possible collisions between camera 102 and these other OOIs.

In an alternative embodiment, in order to prevent interference with a game, the operational area for mobile cameras includes sidelines but does not include the "in-bounds" area of a playing field, while the operational area for players and ball includes the "in-bounds" area of the playing field.

Similarly, block detector 1048 may also process static object positions 1060 and adjust movement plan 150 such that desired perspective 129 is not blocked by stationary object 1062.

In a particular embodiment, railcam and aerial camera locations, including wire and blimp-mounted camera locations, and locations of supporting wires of wire-mounted cameras 952, are input to block detector 1048 and collision detector 1049 to prevent collisions of mobile cameras with camera-support wires and blockage of view by aerial cameras of events and objects of interest in the operational area.

Using the example of FIG. 9, where camera controller 140 controls more than one mobile camera 102, 952, block detector 1048 prevents desired perspective 129 from being blocked by another controlled camera, and collision detector 1049 prevents collision of mobile cameras 102, 952 with other mobile cameras or players. In embodiments, referees and others authorized to be in the operational area are also equipped with tracking devices to prevent collision of mobile cameras with people. In an alternative embodiment, the operational area for mobile cameras is defined to enforce a minimum altitude over a playing field to prevent drones from colliding with people. Since platform 954 is wire based, the location of the supporting wires is also taken into consideration for collision avoidance by collision detector 1049.

In an embodiment, feeds from mobile cameras 102, 952 are provided to a director station, where they may be selected to provide a game or race broadcast video feed. In an alternative embodiment, feeds from mobile cameras 102 assigned to tracking tags 118 for tracking an individual player are automatically selected according to a best view of that player to provide a player-specific feed, and that feed is recorded to provide as a player-specific video, or in racing embodiments a racing-specific video. In yet another embodiment, several player-specific feeds are simultaneously recorded to provide multiple player-specific videos, and provided to a director station, where they may be selected manually or automatically to provide a game or race broadcast video feed. When selected automatically, selections are made according to signals from event detector 160 to cover events of interest in each embodiment, such as catches and tackles.

Figure 13:
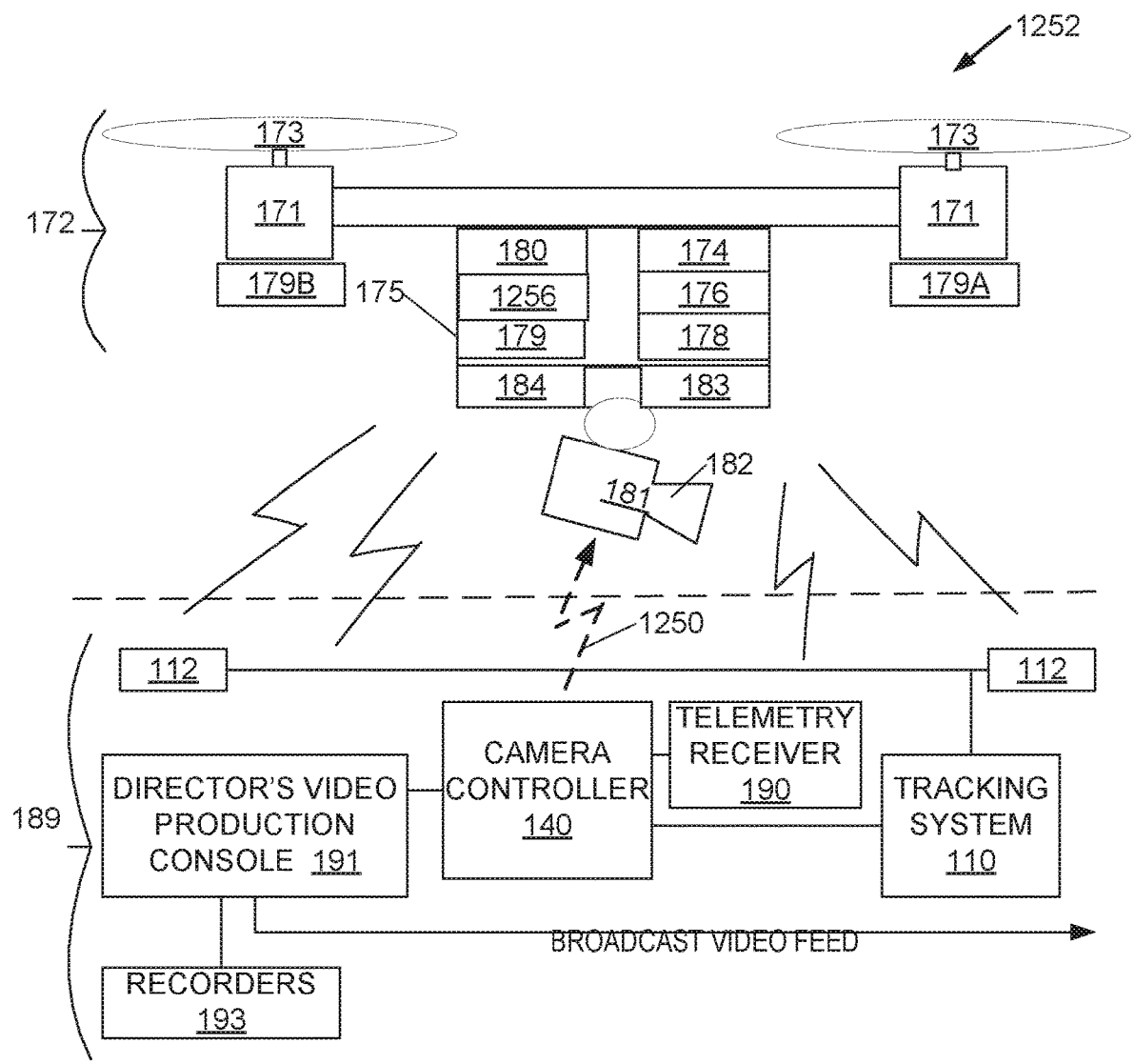
FIG. 13 is a schematic block diagram showing components of the system associated with a mobile camera, and stationary hardware, showing features used in during autonomous mode.

In normal operation, camera controller 140 is in digital radio contact with each mobile camera platform; camera controller 140 controls platform movement as well as camera lens orientation and magnification through servo commands radioed to each camera platform. As illustrated in FIG. 13, mobile camera platforms drones may occasionally lose the remote control signal 1250 (FIG. 13) from camera controller 140, suffering a loss of signal in a camera platform remote control receiver 176, which may be due to interference such as when another platform passes between a transmitting antenna of camera controller 140 and a particular mobile camera platform 1252. In an embodiment, to provide continued coverage during temporary remote-control signal interruptions, mobile camera platforms continue movement at the same course and speed, under control of autopilot and local controller 180, and maintain a same rate of angular adjustment of camera angle during a remote-control signal interruption as before signal was lost. Since players may change trajectories, camera magnification is decreased, zooming out slowly on zoom lens 182 so the targeted OOI will probably remain in view. Since continued movement for an extended time may cause unsafe conditions, with the drone leaving the operational area and colliding with spectators in stands, a timeout-timer is started on loss of the remote control signal, in this embodiment each independently mobile camera drone has an internal global positioning system (GPS) receiver, if that mobile camera platform drone is airborne and the timeout-timer expires, or flight battery 174 is sensed as very low, without resumed communications with the camera controller 140, the autopilot and local controller of the drone uses an internal GPS receiver 178 to return to and land at a presumed-safe position within the operational area from which it was launched. Whenever mobile camera platform drone 1252 loses signal 1250, detects a nonfunctional camera controller 140, or is otherwise in autonomous mode it sets an autonomous flag in its tracker's telemetry stream to warn camera controller 140 to prevent collisions by maneuvering other mobile camera platform drones as the drone without signal may not be able to respond to movement commands.

In an alternative embodiment, when remote-control signal 1250 is lost, or detects camera controller 140 has lost functionality, the mobile camera platform goes into autonomous mode and sets its autonomous flag, feed from camera 181 is fed to a visual tracking module 1256 that may be integrated with autopilot and local controller 180. In this embodiment, autopilot and local controller 180 and visual tracking module 1256 cooperate to maneuver the mobile camera platform while attempting to keep a same player in view at approximately the same perspective as before signal 1250 was lost. As with other autonomous embodiments, autopilot and local controller 180 is configured to use GPS receiver 178 to the position from which it was launched on low battery, on expiration of a maximum autonomous-mode timeout timer, or when it determines it has left a configured operational area.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for controlling a mobile camera to capture a perspective view of an object of interest (OOI), comprising:
    continually determining, from at least one tracking tag attached to an OOI, an OOI location and an OOI orientation of the OOI;
    continually determining, from at least one tracking tag attached to the mobile camera, a camera location and a camera orientation of the mobile camera; and
    controlling the camera location and the camera orientation, based on at least the OOI location and the OOI orientation, such that the mobile camera maintains the perspective view of the OOI as at least the OOI orientation changes.

2. The method of claim 1, wherein said controlling the camera location and the camera orientation includes controlling the camera location and the camera orientation such that the mobile camera maintains the perspective view of the OOI as both the OOI orientation and the OOI location change.

3. The method of claim 2, wherein said controlling the camera location and the camera orientation includes controlling magnification of the mobile camera.

4. The method of claim 3, further comprising:
predicting movement of the OOI based on one or both of the OOI location and the OOI orientation;
generating a movement plan for the mobile camera based on the predicted movement of the OOI, to maintain the perspective view of the OOI; and
controlling the mobile camera based on the movement plan.

5. The method of claim 3, further comprising:
continually determining, from at least one tracking tag attached to a second OOI, a second OOI location and a second OOI orientation of the second OOI;
continually determining, from at least one tracking tag attached to a second mobile camera, a second camera location and a second camera orientation of the second mobile camera; and
controlling the second camera location and the second camera orientation, based on at least the second OOI location and the second OOI orientation, such that the second mobile camera maintains a perspective view of the second OOI as at least the second OOI orientation changes.

6. The method of claim 5, further comprising:
detecting an event involving the OOI and the second OOI based on changes in one or more of the OOI location, the OOI orientation, the second OOI location, and the second OOI orientation; and
adjusting the perspective view of one or both of the OOI and the second OOI to provide coverage of the event.

7. The method of claim 6, the event comprising at least one of a tackle, a pass reception, and a quarterback sack during a football-related event.

8. The method of claim 6, the event comprising two racers in close proximity during a race-related event.

9. The method of claim 5, further comprising coordinating movement of the mobile cameras to prevent obstruction of the perspective view of one or both of the OOI and the second OOI.

10. The method of claim 9, further comprising restricting movement of the mobile cameras to an operational area.

11. The method of claim 10, further comprising coordinating movement of the mobile cameras to prevent a collision between the mobile cameras.

12. A method for controlling a mobile camera to capture a perspective view of an object of interest (OOI), comprising:
continually determining, from at least one tracking tag attached to the OOI, an OOI location and an OOI orientation of the OOI;
continually determining, from at least one tracking tag attached to the mobile camera, a camera location and a camera orientation of the mobile camera; and
generating a movement plan for the mobile camera such that the mobile camera maintains the perspective view of the OOI as at least the OOI orientation changes, the movement plan being based on at least the OOI location, the OOI orientation, the camera position, and the camera orientation.

13. The method of claim 12, the movement plan defining a velocity of the mobile camera and a change in the camera orientation.

14. The method of claim 12, further comprising predicting movement of the OOI based on a temporal sequence of OOI locations and OOI orientations wherein said generating the movement plan is based on the predicted movement.

15. The method of claim 12, further comprising controlling the mobile camera based on the movement plan.

16. A system for controlling a mobile camera to capture a perspective view of an object of interest (OOI), comprising:
at least one OOI tracking tag configured to be attached to the OOI and periodically transmit an OOI location signal;
at least one camera tracking tag configured to be attached to the mobile camera and periodically transmit a camera location signal;
a tracking apparatus having at least three receivers configured to receive the OOI and camera location signals and determine therefrom an OOI location and an OOI orientation of the OOI, and a camera location and a camera orientation of the mobile camera; and
a camera controller having a processor and a memory storing machine-readable instructions that when executed by the processor, direct the camera controller to generate a movement plan for the first mobile camera such that the mobile camera maintains the perspective view of the OOI as at least the OOI orientation changes, the movement plan being based on the OOI location, the OOI orientation, the camera location, and the camera orientation.

17. The system of claim 16,
the at least one OOI tracking tag including one or more sensors configured to detect the OOI orientation, wherein the at least one OOI tracking tag is additionally configured to transmit the OOI orientation to the camera controller; and
the at least one camera tracking tag including one or more sensors configured to detect the camera orientation, wherein the at least one camera tracking tag is additionally configured to transmit the camera orientation to the camera controller.

18. The system of claim 16, the camera controller storing additional machine-readable instructions that direct the camera controller to:
predict movement of the OOI based on a temporal sequence of OOI locations and OOI orientations, and
generate the movement plan based on the predicted movement.

19. The system of claim 16, further comprising:
at least one additional OOI tracking tag configured to be affixed to a second OOI and periodically transmit a second OOI location signal; and
at least one additional camera tracking tag configured to be affixed to a second mobile camera and periodically transmit a second camera location signal;
wherein the tracking apparatus is further configured to receive the second OOI location signal and the second camera location signal, and determine therefrom a second OOI location, a second OOI orientation, a second camera location, and a second camera orientation; and
wherein the camera controller stores additional machine-readable instructions that direct the camera controller to generate a movement plan for the second mobile camera such that the second mobile camera maintains a perspective view of the second OOI as at least the second OOI orientation changes, the movement plan being based at least on the second OOI location, the second OOI orientation, the second camera location, and the second camera orientation.

20. The system of claim 19, wherein the camera controller stores additional machine-readable instructions that direct the camera controller to:
- restrict movement of the mobile cameras to an operational area,
- coordinate movement of the mobile cameras to prevent obstruction of the perspective view of one or both of the OOI and the second OOI, and
- coordinate movement of the mobile cameras to prevent a collision between the mobile cameras.

* * * * *